(12) United States Patent
Wu et al.

(10) Patent No.: US 7,857,487 B2
(45) Date of Patent: Dec. 28, 2010

(54) MINIATURIZED LINEAR LIGHT SOURCE SUB-MODULE FOR VARIOUS FORMAT MAIN MODULES

(75) Inventors: Rong-Yaw Wu, Hsien-Tien (TW);
Shih-Che Chen, Hsin-Tien (TW);
Yen-Chieh Chen, Hsin-Tien (TW);
Chih-Ming Yen, Hsin-Tien (TW);
Ching-Yi Chen, Hsin-Tien (TW)

(73) Assignee: Pixon Technologies Corp., Hsin-Tien (TW)

( * ) Notice: Subject to any disclaimer, the term of this patent is extended or adjusted under 35 U.S.C. 154(b) by 233 days.

(21) Appl. No.: 12/270,972

(22) Filed: Nov. 14, 2008

(65) Prior Publication Data

US 2010/0124063 A1    May 20, 2010

(51) Int. Cl.
*F21V 7/07*    (2006.01)
(52) U.S. Cl. .................. 362/296.05; 362/268; 362/297; 362/301; 362/223
(58) Field of Classification Search ............ 362/296.05, 362/268, 297, 301, 303, 612, 623, 628, 217.01, 362/222, 223, 217.02, 217.05, 217.1
See application file for complete search history.

(56) References Cited

U.S. PATENT DOCUMENTS

| | | | | |
|---|---|---|---|---|
| 5,590,945 A | * | 1/1997 | Simms | ........................ 362/623 |
| 6,305,813 B1 | * | 10/2001 | Lekson et al. | ................ 362/625 |
| 6,363,603 B1 | * | 4/2002 | Nemoto et al. | ................. 29/458 |
| 6,565,225 B2 | * | 5/2003 | Mabuchi et al. | ............. 362/610 |
| 7,572,045 B2 | * | 8/2009 | Hoelen et al. | ................ 362/628 |
| 2003/0142507 A1 | * | 7/2003 | Sugiyama | .................... 362/551 |
| 2006/0221612 A1 | * | 10/2006 | Song et al. | ................... 362/247 |
| 2008/0123367 A1 | * | 5/2008 | Pan et al. | ..................... 362/628 |
| 2008/0158478 A1 | * | 7/2008 | Hsiao et al. | .................... 349/65 |

* cited by examiner

*Primary Examiner*—Evan Dzierzynski
(74) *Attorney, Agent, or Firm*—Ming Chow; Sinorica, LLC

(57) ABSTRACT

A miniaturized linear light source sub-module comprising a symmetrical lens array, a light guide bar with dual reflecting surfaces, at least one light emitting diode light source, and a sub-module housing is disclosed. The symmetrical lens array comprises two identical covers, two identical lens sections, and a middle holder. Each lens section comprises a plurality of lenses disposed on the top and bottom of the lens section. The dual reflecting surface light guide comprises a light emitting surface, a v-shaped light reflecting surface, an asymmetrical saw-toothed light reflecting surface, an apex cut-off surface, and a bottom cut-off surface. At least one light emitting diode light source is connected to an end of the dual reflecting surface light guide. The sub-module housing holds the lens array assembly, the dual reflecting surface light guide, and the at least one light emitting diode light source to form the miniaturized linear light source sub-module.

28 Claims, 20 Drawing Sheets

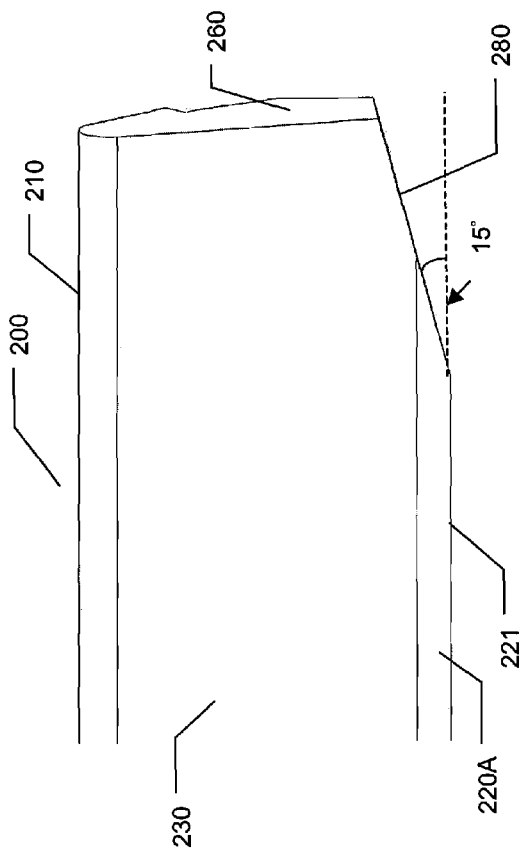
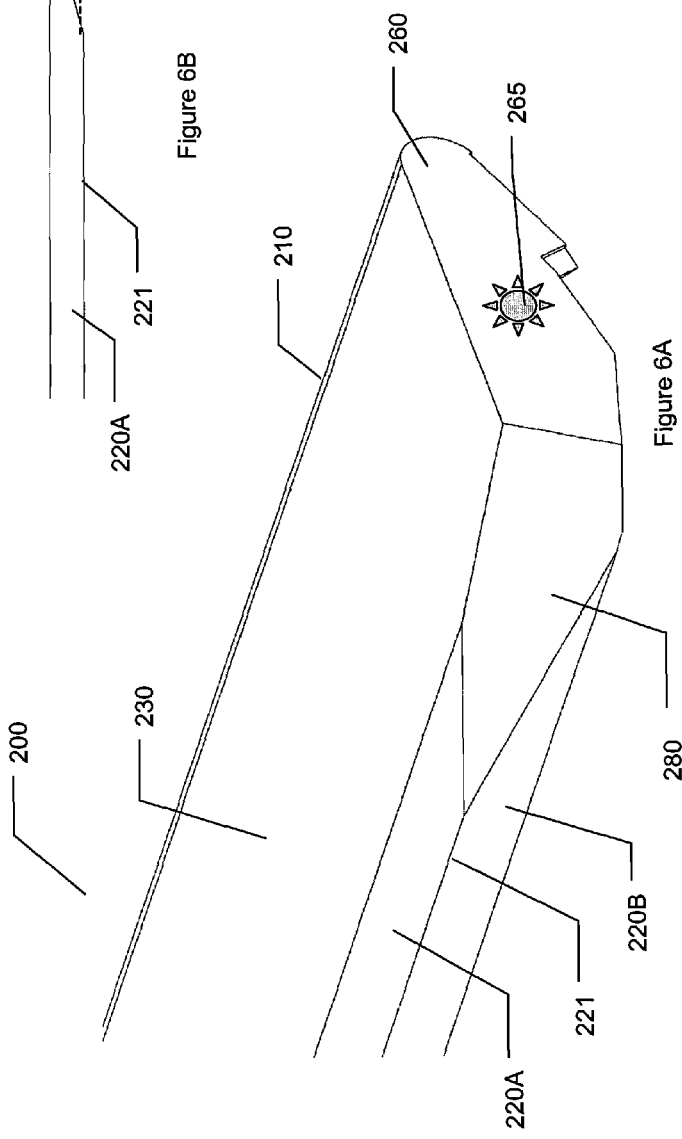

MINIATURIZED LINEAR LIGHT SOURCE SUB-MODULE FOR VARIOUS FORMAT MAIN MODULES

BACKGROUND OF THE INVENTION

1. Field of the Invention

The present invention relates to optics. More specifically, the present invention discloses a miniaturized linear light source sub-module comprising a highly efficient light guide with a first reflecting surface to maximize light reflection and a second reflecting surface to enhance the uniformity of the emitted light, at least one light emitting diode light source, an array of lenses for high-resolution imaging of a surface, and a sub-module housing.

2. Description of the Prior Art

Linear light sources emit light in a different direction from the direction the light originated from. For example, a light is produced by a light emitting diode at an angle of zero degrees. By affecting the direction of the light beam the linear light source can emit the light at various angles such as 90 degrees.

Refer to FIG. 1A, which is a drawing illustrating a light source of the prior art. As shown in FIG. 1A, the conventional light source comprises a light emitting diode 110 and a transparent light rod 120. Both ends of the transparent light rod 120 are flat surfaces. When power is applied to the light emitting diode 110 the light emitting diode 110 emits light. Some of the light enters the transparent light rod 120. However, since the end of the transparent light rod 120 is flat, much of the light is reflected back and is lost. This lowers the efficiency and intensity of the light source.

The light that enters the transparent light rod 120 exits the side surface of the transparent light rod 120. Unfortunately, some of the light exits the transparent light rod 120 in directions not intended. This results in an additional loss of light. To overcome this disadvantage a reflective housing must be used in order to try to reflect the escaping light back into the transparent light rod 120. This increases the cost of the light source.

Additionally, since only one light emitting diode 110 is utilized in the conventional light source the emitted light is brighter closer to the light emitting diode 110 and dimmer at the far end of the transparent light rod 120. As a result the conventional light source's emitted light is not uniform.

Therefore, there is need for an improved light guide for a linear light source that is highly efficient and provides an emitted light that is uniform in intensity.

Traditionally, the lens for a one to one imaging optical scanner is a rod lens array. Please refer to FIG. 1B, a perspective drawing of a prior-art rod lens array 130. The rod lens array 130 is constructed from a plurality of fiber optic rod lenses 131. Each individual fiber optic rod lens 131 is cut from a fiber optic glass strand, and its ends must be polished. The plurality of fiber optic rod lenses 131 are then arranged side by side, in a row or multiple rows with their optical axes in parallel, in a frame 132 and held in place by an adhesive layer 133. The fiber optic rod lenses 131 are typically made from GRIN (graduated index) fibers, with the refractive index of the glass carefully controlled during manufacture to have a graduated refractive index that decreases radially from the central axis to the edge.

However, this type of lens is expensive to manufacture. GRIN type fiber optic glass strands are expensive in and of themselves; cutting and polishing the strands to precise lengths to form fiber optic rod lenses 131, assembling them so that their axes are precisely parallel in the frame 132, and gluing the fiber optic rod lenses 131 are all precision steps for which entire technologies have had to be developed in order to satisfy requirements.

In addition, a major disadvantage of this type of lens is that because of the number of lenses and the difficulty in orienting them, it is not practical to shape the ends of the lenses so that they can magnify the surface that they are imaging; flat ends are used. In order to increase the imaging resolution, it is necessary to use larger numbers of smaller-diameter rod lenses 131, limiting the maximum resolution and driving up the costs as the desired resolution increases. Furthermore, suppliers for the necessary GRIN fiber optic strands are limited, and thus the base materials themselves are expensive.

Additional, the glass used in the conventional rod lens contains lead which is not environmentally friendly.

Therefore there is need for an improved lens array for which materials are substantially cheaper and which is simpler to manufacture, and which can have increased resolution without substantially increasing costs.

SUMMARY OF THE INVENTION

To achieve these and other advantages and in order to overcome the disadvantages of the conventional method in accordance with the purpose of the invention as embodied and broadly described herein, the present invention provides a miniaturized linear light source sub-module comprising a highly efficient light guide with a first reflecting surface to maximize light reflection and a second reflecting surface to enhance the uniformity of the emitted light, at least one light emitting diode light source, an array of lenses for high-resolution imaging of a surface, and a sub-module housing.

The highly efficient light guide of the miniaturized linear light source sub-module maximizes light reflection, prevents light loss at the entry point, and provides a uniform emitted light.

The light guide for a miniaturized linear light source sub-module of the present invention is comprised of transparent or semi-transparent material. The light guide bar is solid, semi-hollow or hollow.

The light guide of the present invention comprises a light emitting surface, a v-shaped light reflecting surface, an asymmetrical saw-toothed light reflecting surface, a bottom surface, a top surface, a light entry end surface, a light entry opposite end surface, an apex cut-off surface, and a bottom cut-off surface.

The light emitting surface is a surface of the light guide where light exits the light guide.

The v-shaped light reflecting surface is disposed on a surface of the light guide opposite the light emitting surface. The v-shaped light reflecting surface comprises two light reflecting surfaces at 90° apart. The center of the v-shaped light reflecting surface where the two light reflecting surfaces meet is the apex of the v-shaped light reflecting surface. The v-shaped light reflecting surface maximizes light output.

The top surface is disposed between the light emitting surface and the v-shaped light reflecting surface. The bottom surface is disposed opposite the top surface next to the bottom of the v-shaped light reflecting surface.

The asymmetrical saw-toothed light reflecting surface is disposed between the bottom surface and the light emitting surface. The asymmetrical saw-toothed light reflecting surface comprises a plurality of notches and ridges with increasing gradient from the light entry end to the end surface opposite the light entry end. The asymmetrical saw-toothed light reflecting surface enhances the uniformity of the emitted light.

Light emitted by a light source enters the light guide through the light entry end surface. The light exits the light guide on the light emitting surface. The asymmetrical sawtoothed light reflecting surface makes the emitted light more uniform in intensity thereby enhancing the quality of the linear light source.

The asymmetrical saw-toothed light reflecting surface comprises a plurality of notches and ridges. The depth of the notches is deepest on the light guide furthest away from the LED light source. The farther away from the LED light source the depth of the notches of the asymmetrical saw-toothed light reflecting surface gradually increases. In this way the asymmetrical saw-toothed light reflecting surface affects the light more gently where the light intensity is strongest (closer to the LED light source).

The light guide further comprises an apex cut-off surface and a bottom cut-off surface at the light entry end of the light guide to prevent light loss at the light entry point further enhancing the light channeling performance.

Additionally, the light travels through the light guide at various angles and is reflected by the v-shaped light reflecting surface thereby maximizing light output.

The lens array of the miniaturized linear light source sub-module comprises a plurality of lens faces molded into surfaces of polymer bars, thus simplifying manufacturing, using inexpensive materials, and aligning the lenses without requiring significant manufacturing infrastructure.

The present invention further provides a lens array where the lens faces are configurable at the time of design to support increased resolution.

The lens array of the present invention comprises two identical covers, two identical lens sections, and a middle holder. Each lens section comprises a plurality of lenses disposed on the top and bottom of the lens section. The lens array is assembled with the middle holder positioned between the two lens sections. The two covers are positioned one cover on the top of the upper lens section and one cover positioned on the bottom of the lower lens section. The two covers hold the lens array assembly together.

Since each lens section is identical and each cover is identical the same lens section tooling is used for all lens sections and the same cover tooling is used for all covers. As a result, manufacturing cost is reduced and assembly is simplified.

A plurality of first lenses gathers and focuses light reflected from an object so that the light travels in a divergent beam through the first lens section to a second plurality of lens surfaces. The light is generated by an external source. The middle holder blocks and absorbs scattered light, while a plurality of holes allow desired, focused light to reach the third plurality of lens surfaces. The light then transits the second lens section and exits through a fourth plurality of lens surfaces, which focuses the light onto a sensor or sensors.

The linear light source sub-module of the present invention further comprises a sub-module housing for holding the lens array assembly, the dual reflecting surface light guide, and the at least one light emitting diode light source to form the miniaturized linear light source sub-module.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 6A-6B are drawings illustrating an apex cut-off surface of the light guide according to an embodiment of the present invention;

DESCRIPTION OF THE PREFERRED EMBODIMENTS

Figure 1A:
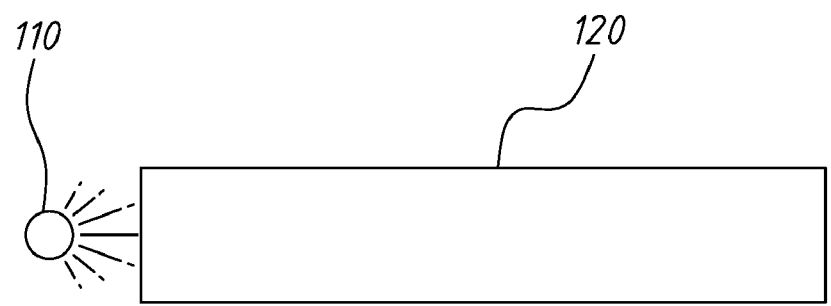
FIG. 1A is a drawing illustrating a light source of the prior art.
Figure 1B:
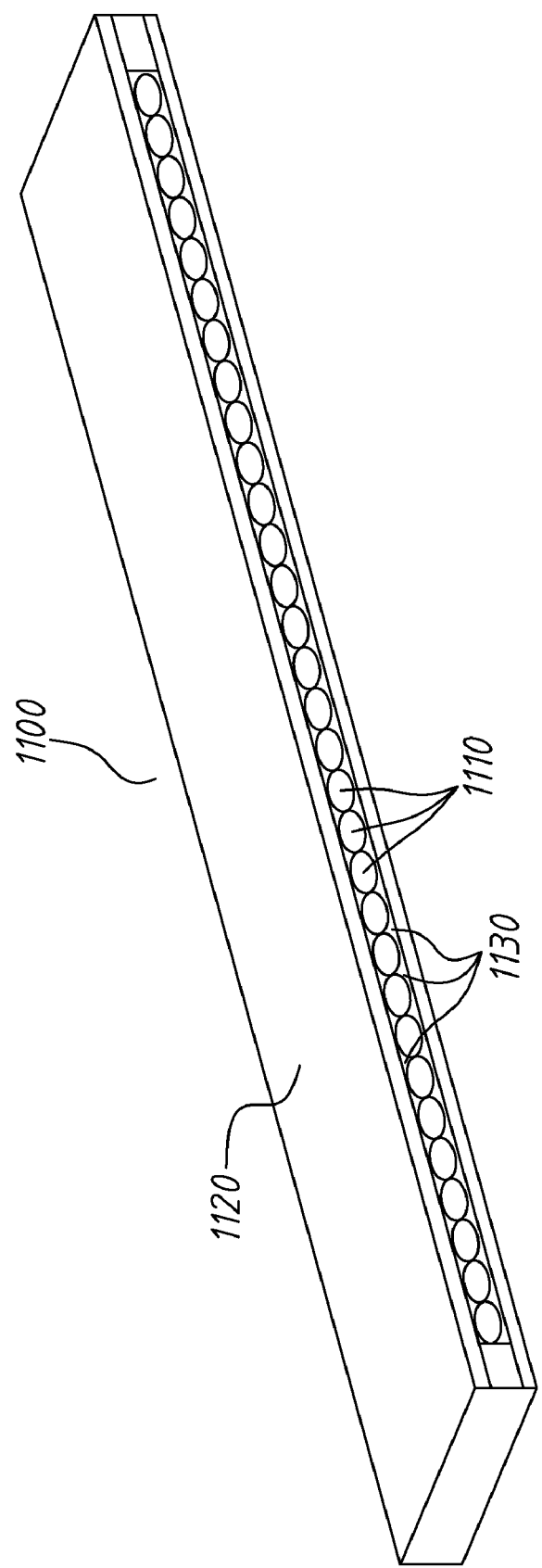
FIG. 1B is a perspective drawing of a prior art rod lens array.

Reference will now be made in detail to the preferred embodiments of the present invention, examples of which are illustrated in the accompanying drawings. Wherever possible, the same reference numbers are used in the drawings and the description to refer to the same or like parts.

Figure 2:
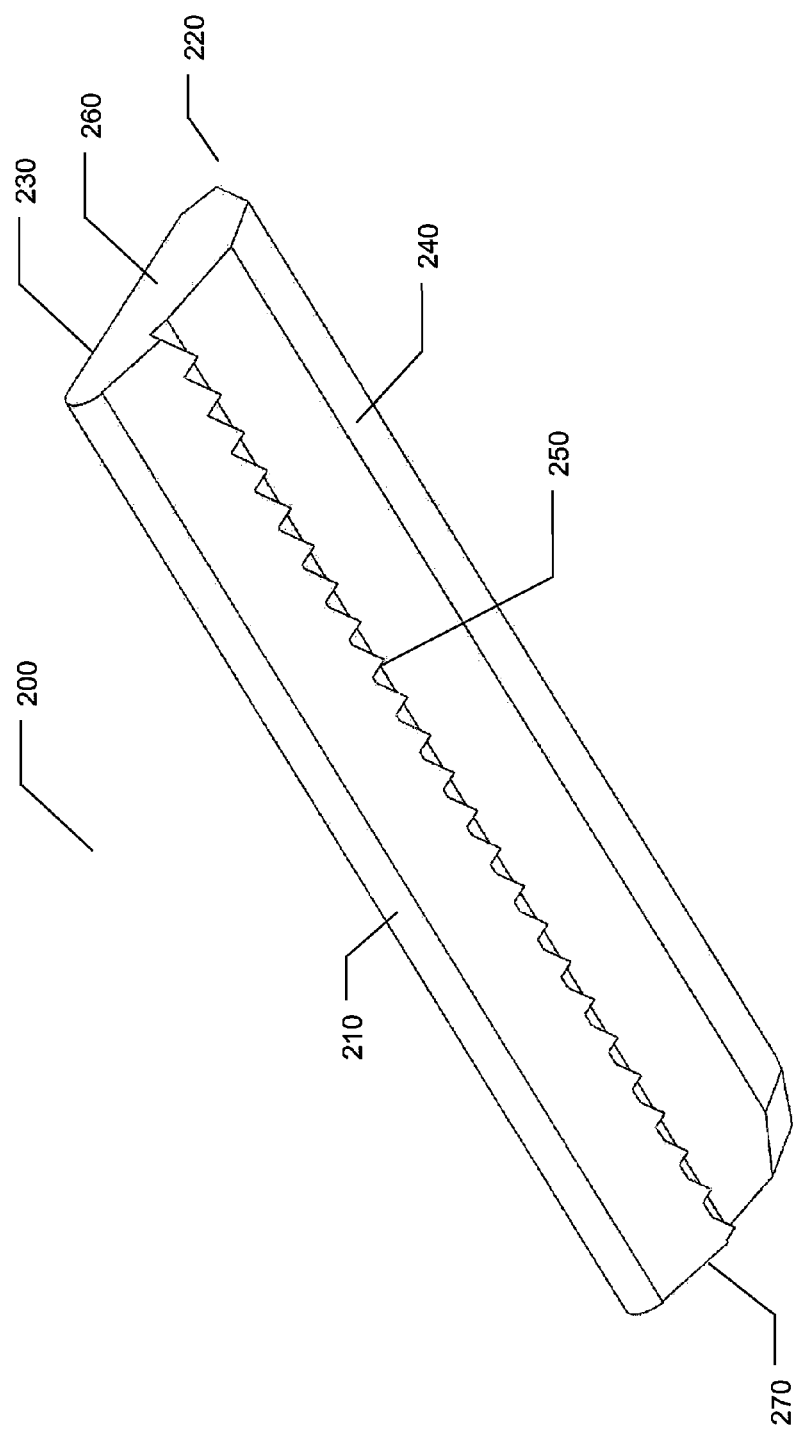
FIG. 2 is a three dimensional drawing illustrating a light guide with an asymmetrical saw-toothed light reflecting surface according to an embodiment of the present invention.
Figure 3:
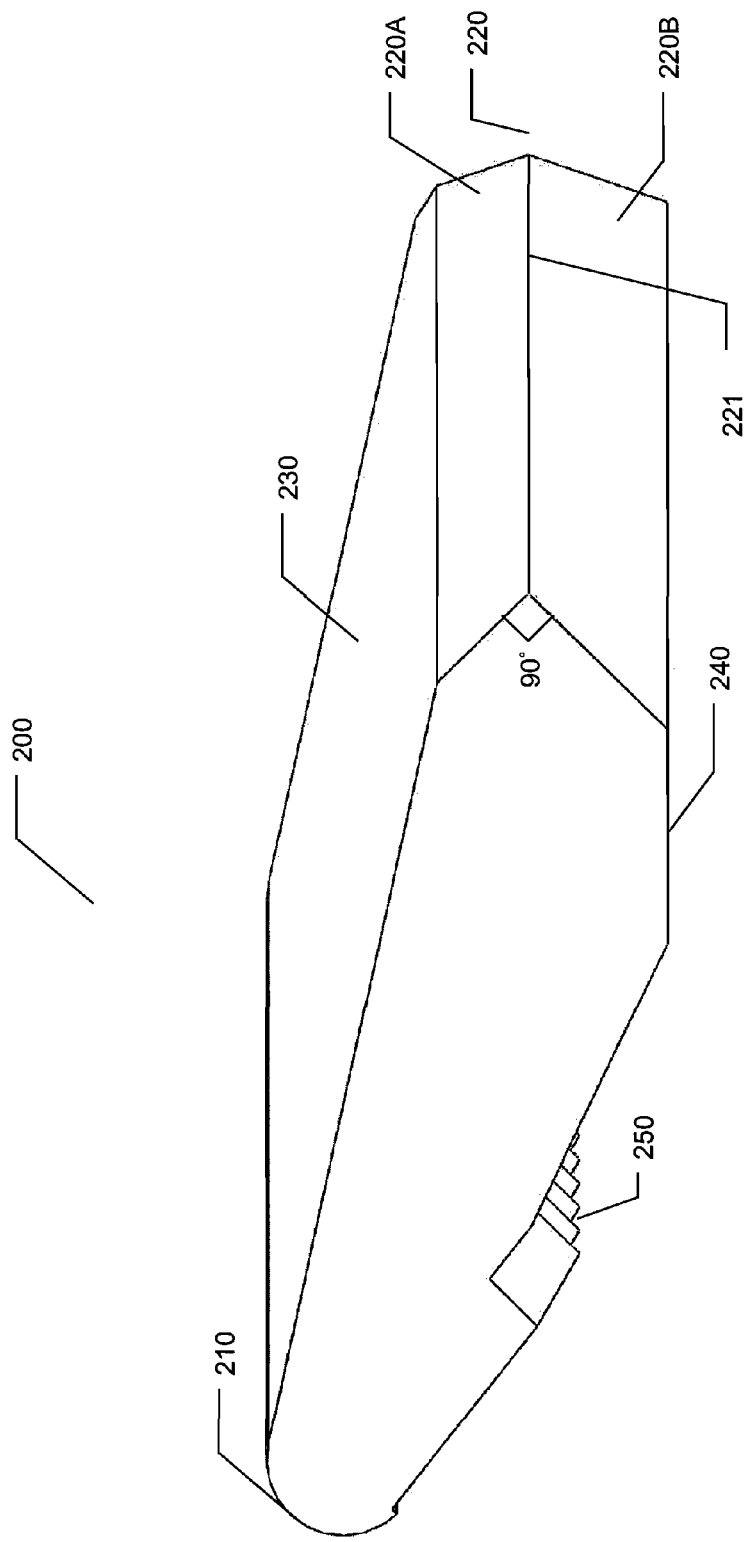
FIG. 3 is a perspective view of a light guide with a circular light emitting surface according to an embodiment of the present invention.
Figure 4:
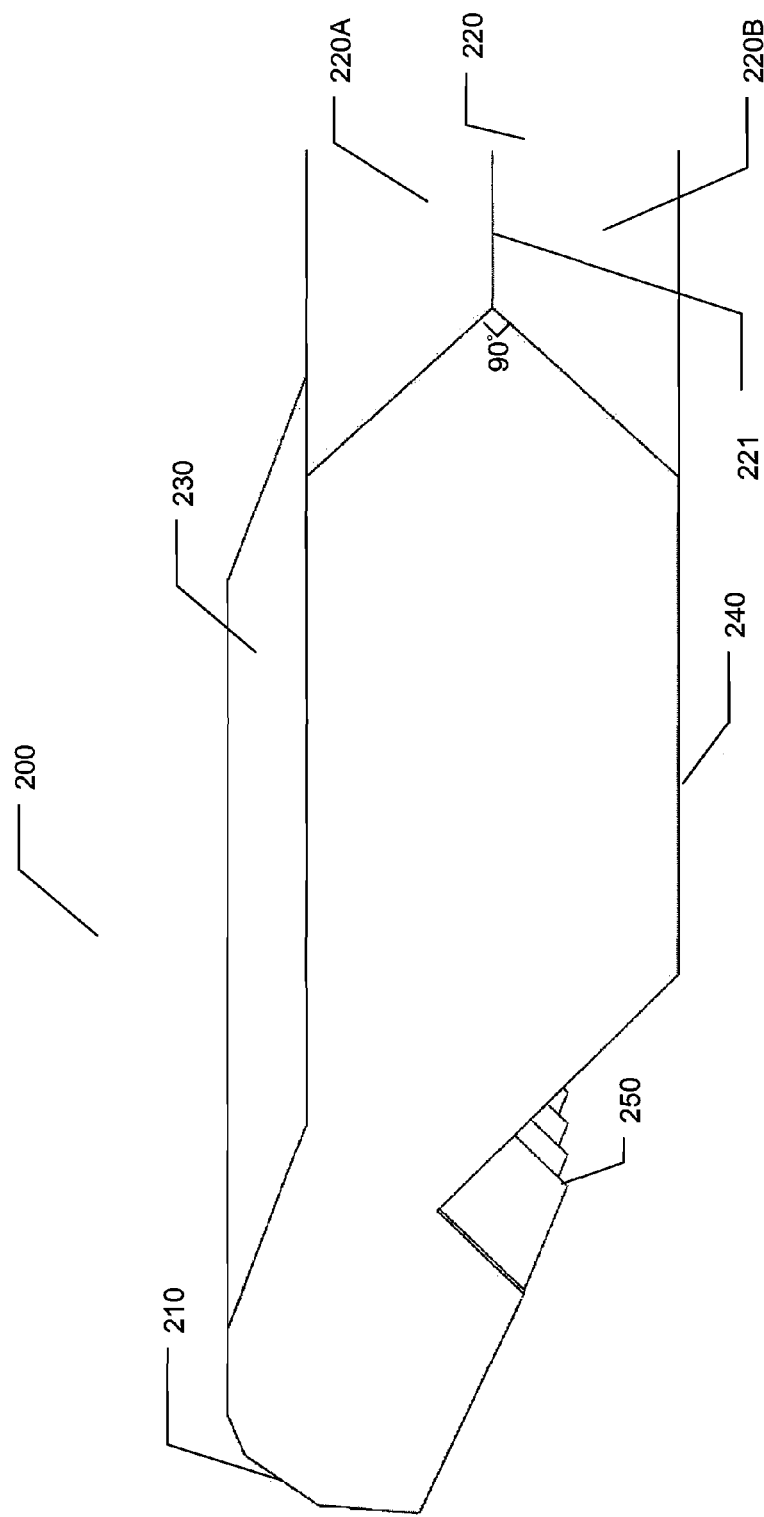
FIG. 4 is a perspective view of a light guide with a polygonal light emitting surface according to an embodiment of the present invention.

Refer to FIG. 2, which is a three dimensional drawing illustrating a light guide with an asymmetrical saw-toothed light reflecting surface according to an embodiment of the present invention, to FIG. 3, which is a perspective view of a light guide with a circular light emitting surface according to an embodiment of the present invention, and to FIG. 4, which is a perspective view of a light guide with a polygonal light emitting surface according to an embodiment of the present invention.

The light guide 200 of the present invention comprises a light emitting surface 210, a v-shaped light reflecting surface 220, an asymmetrical saw-toothed light reflecting surface 250, a bottom surface 240, a top surface 230, a light entry end surface 260, and a light entry opposite end surface 270.

The light emitting surface 210 is a surface of the light guide 200 where light exits the light guide 200. In the embodiment illustrated in FIG. 3 the light emitting surface is a circular or arc-shaped surface. In the embodiment illustrated in FIG. 4 the light emitting surface is a polygonal-shaped surface.

The v-shaped light reflecting surface 220 is disposed on a surface of the light guide 200 opposite the light emitting surface 210. The v-shaped light reflecting surface 220 comprises two light reflecting surfaces, a top light reflecting surface 220A and a bottom light reflecting surface 220B, at 90° apart. The center of the v-shaped light reflecting surface 220 where the two light reflecting surfaces meet is the apex 221 of the v-shaped light reflecting surface 220. The v-shaped light reflecting surface 220 maximizes light output.

The top surface 230 is disposed between the light emitting surface 210 and the v-shaped light reflecting surface 220. The bottom surface 240 is disposed opposite the top surface 230 next to the bottom light reflecting surface 220B of the v-shaped light reflecting surface 220.

The asymmetrical saw-toothed light reflecting surface 250 is disposed between the bottom surface 240 and the light emitting surface 210. The asymmetrical saw-toothed light reflecting surface 250 comprises a plurality of notches and ridges with increasing gradient from the light entry end surface 260 to the light entry opposite end 270 which is the end surface of the light guide 200 opposite the light entry end surface 260. The asymmetrical saw-toothed light reflecting surface 250 enhances the uniformity of the emitted light.

Figure 5:
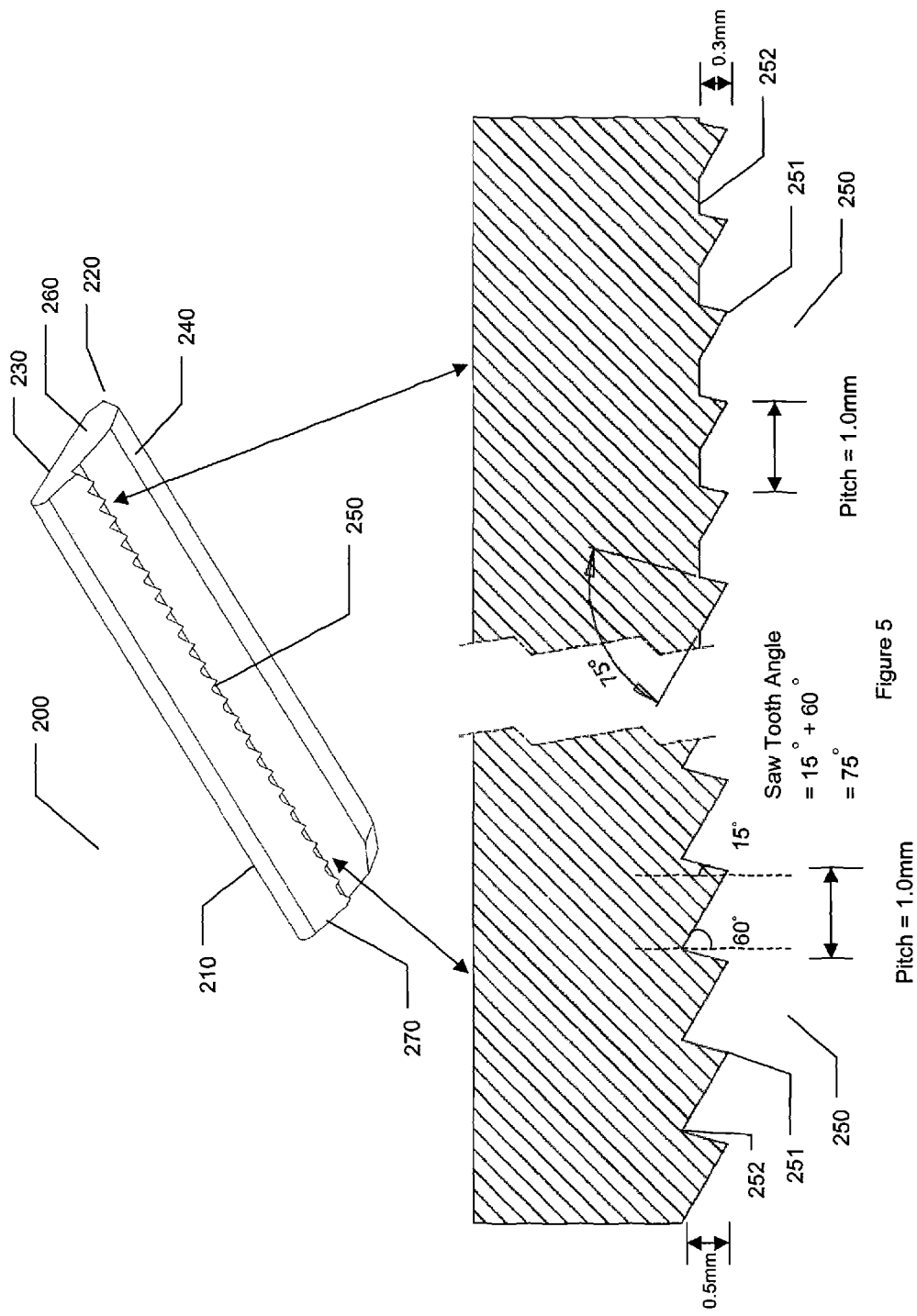
FIG. 5 is a drawing illustrating an asymmetrical saw-tooth pattern of the asymmetrical saw-toothed light reflecting surface according to an embodiment of the present invention.

Refer to FIG. 5, which is a drawing illustrating an asymmetrical saw-tooth pattern of the asymmetrical saw-toothed light reflecting surface according to an embodiment of the present invention.

As shown in FIG. 5, the asymmetrical saw-toothed light reflecting surface 250 comprises an asymmetrical saw-tooth pattern of ridges 251 and notches 252. The asymmetrical saw-tooth pattern gradually increases in gradient from the light entry end surface 260 to the end opposite the light entry surface 270. The asymmetrical saw-tooth pattern has a constant saw-tooth angle and a constant pitch. In this embodiment of the present invention the constant saw-tooth angle is 75°. In other embodiments of the present invention the constant saw-tooth angle is greater or less than 75°. Also, in this embodiment the constant pitch is 1.0 mm. In other embodiments of the present invention the constant pitch is greater or less than 1.0 mm.

The saw-tooth height of the asymmetrical saw-tooth pattern gradually increases in height as the pattern moves away from the light entry end surface 260 and towards the opposite end 270 of the light guide 200. As shown in the lower left side of FIG. 5 at the end 270 of the light guide 200 the greatest distance from the light entry end surface 260 the ridges 251 and notches 252 are clearly defined to produce the asymmetrical pattern. At this end 270 the saw-tooth height or depth is greatest.

As shown in the lower right side of FIG. 5 at the end of the light guide 200 closest to the light entry end surface 260 the ridges 251 are clearly defined but the notches 252 are shallow valleys with flat surfaces. Again, as the pattern moves from the light entry end surface 260 towards the opposite end 270 of the light guide 200 the shallow valleys of the notches 252 gradually increase in depth until the notches 251 are clearly defined to produce a distinct saw-tooth.

In the embodiment illustrated in FIG. 5 the asymmetrical saw-tooth pattern begins with a saw-tooth height of 0.3 mm at the light entry end and rises to a saw-tooth height of 0.5 mm at the opposite end of the light guide. In other embodiments of the present invention other saw-tooth heights are utilized.

Refer to FIGS. 6A and 6B, which are drawings illustrating an apex cut-off surface of the light guide according to an embodiment of the present invention.

In the embodiment illustrated in FIGS. 6A and 6B the light guide 200 further comprises an apex cut-off surface 280. The apex cut-off surface 280 is at the light entry end surface 260 of the light guide 200. The apex cut-off surface 280 is at an angle from the apex 221 of the v-shaped light reflecting surface. The apex cut-off surface 280 prevents light loss at the light entry point further enhancing the light channeling performance on the light entry end. Light emitted by a light source 265 enters the light guide 200 via the light entry end surface 260. Light that might normally exit the light guide 200 near the light entry end surface 260 is reflected or channeled by the apex cut-off surface 280. In the embodiment illustrated in FIGS. 6A and 6B the angle from the apex 221 is 15°. In other embodiments of the present invention the angle is greater or less than 15°.

Figure 7:
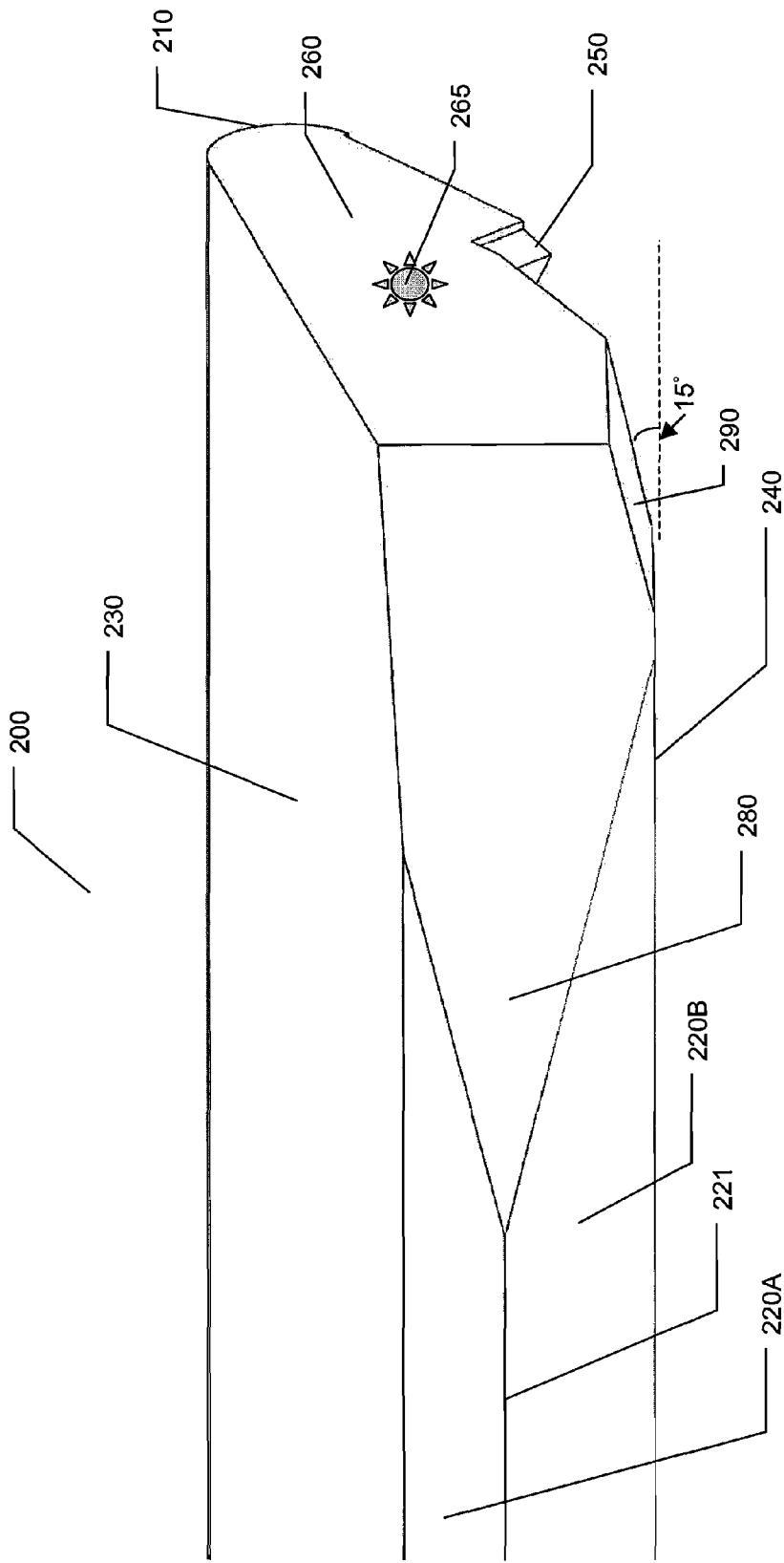
FIG. 7 is a drawing illustrating a bottom cut-off surface of the light guide according to an embodiment of the present invention.

Refer to FIG. 7, which is a drawing illustrating a bottom cut-off surface of the light guide according to an embodiment of the present invention.

In the embodiment illustrated in FIG. 7 the light guide 200 further comprises a bottom cut-off surface 290. The bottom cut-off surface 290 is at the light entry end surface 260 of the light guide 200. The bottom cut-off surface 290 is at an angle from the bottom surface 240 of the light guide 200. The bottom cut-off surface 290 prevents light loss at the light entry point further enhancing the light channeling performance on the light entry end. Light emitted by a light source 265 enters the light guide 200 via the light entry end surface 260. Light that might normally exit the light guide 200 near the light entry end surface 260 is reflected or channeled by the bottom cut-off surface 290. In the embodiment illustrated in FIG. 7 the angle from the bottom surface 240 is 15°. In other embodiments of the present invention the angle is greater or less than 15°.

As described above the light guide of the present invention comprises dual light reflecting surfaces, a v-shaped light reflecting surface for maximizing light output and an asymmetrical saw-toothed light reflecting surface for enhancing the uniformity of emitted light. The v-shaped light reflecting surface comprises two light reflecting surfaces at 90°. The asymmetrical saw-toothed light reflecting surface comprises notches and ridges with increasing gradient from the light entry end of the light guide to the opposite end. The asymmetrical saw-tooth has a constant pitch and constant saw-tooth angle. The light guide further comprises an apex cut-off surface and a bottom cut-off surface at the light entry end of the light guide to prevent light loss at the light entry point further enhancing the light channeling performance.

Figure 8:
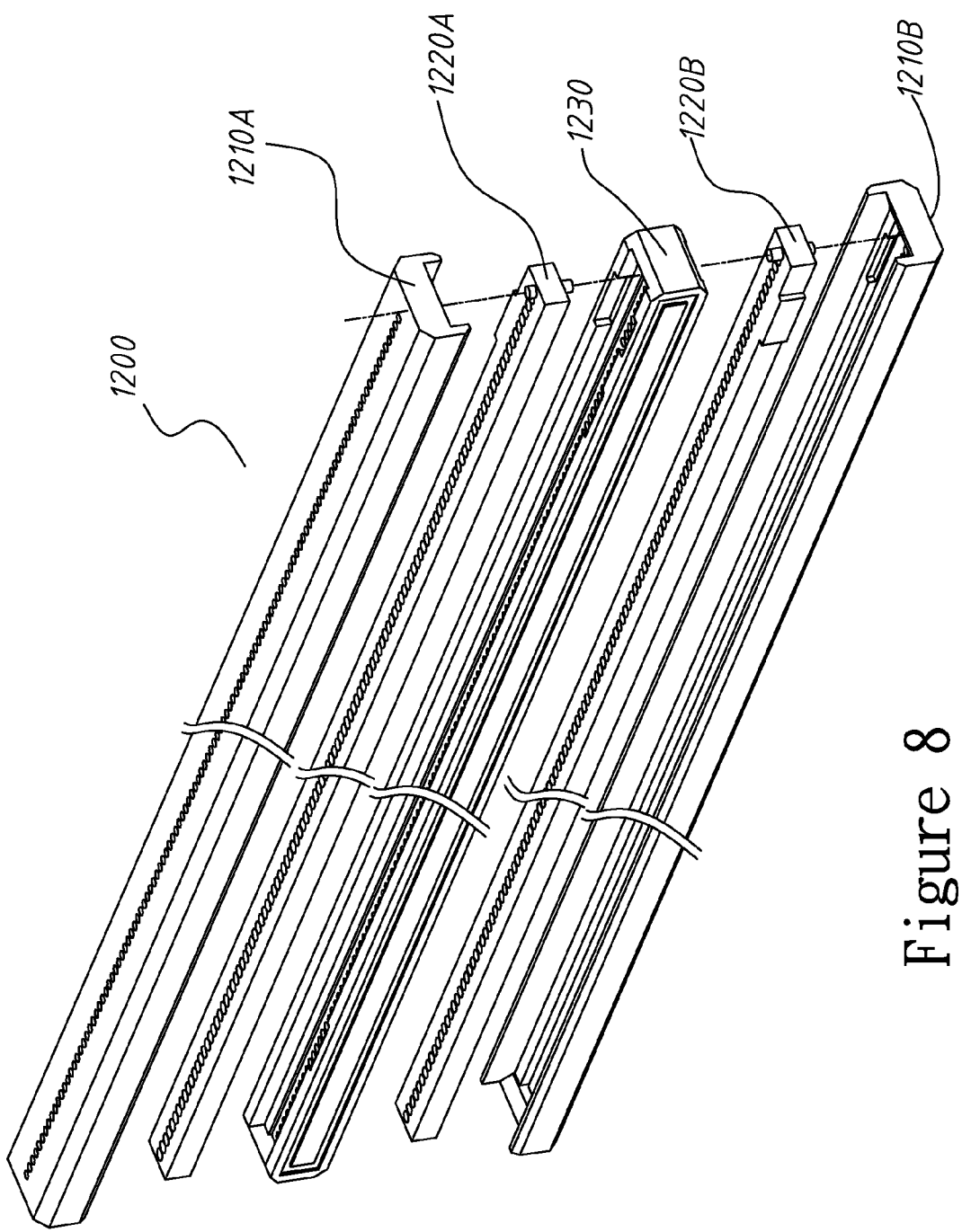
FIG. 8 is an exploded perspective drawing of a lens array of a miniaturized linear light source sub-module according to an embodiment of the present invention.

Please refer to FIG. 8, which shows an exploded perspective drawing of a lens array of a miniaturized linear light source sub-module of the present invention. The lens array 1200 of this embodiment consists of a first cover 1210A, a second cover 1210B, a first lens section 1220A, a second lens section 1220B, and a middle holder 1230. Each component is discussed in further detail below. The first cover 1210A and the second cover 1210B enclose the perimeter of the assembled lens array 1200, providing support, mounting, and protection, as well as blocking out external light.

The middle holder 1230 and the covers 1210A, 1210B comprise a plurality of holes organized such that the centers of the holes form a line down the center of the middle holder 1230 and the covers 1210A, 1210B. The holes are spaced apart equally by the inter-axis distance. The holes are circular, oval, cylindrical, or conical.

Figure 9:
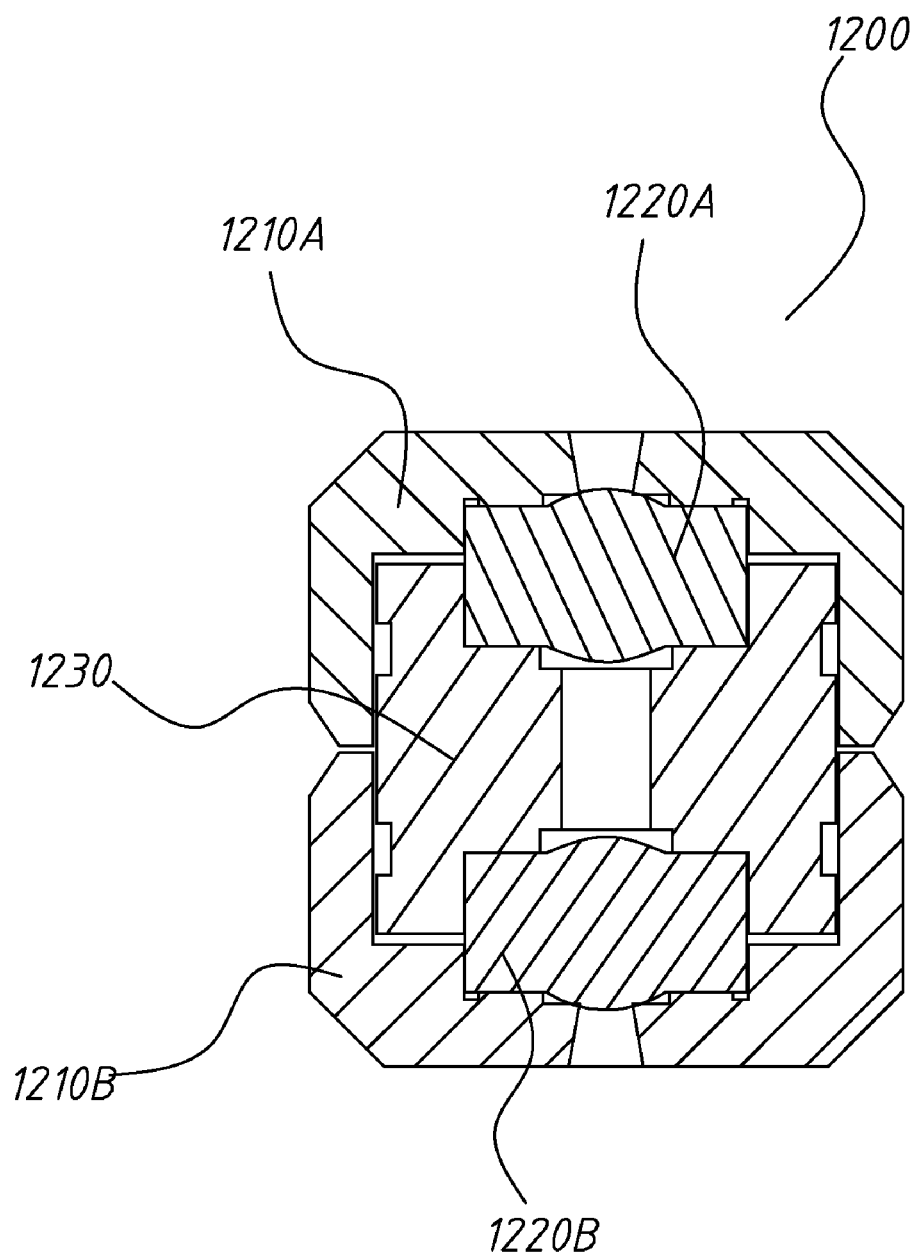
FIG. 9 is a cross-sectional view of a lens array of a miniaturized linear light source sub-module according to an embodiment of the present invention.

Refer to FIG. 9, which is a cross-sectional view of a lens array of a miniaturized linear light source sub-module according to an embodiment of the present invention.

Each lens section 1220A, 1220B comprises a plurality of lenses disposed on the top and bottom of the lens section 1220A, 1220B. The lens array 1200 is assembled with the middle holder 1230 positioned between the two lens sections 1220A, 1220B. The two covers 1210A, 1210B are positioned one cover 1210A on the top of the upper lens section 1220A and one cover 1210B positioned on the bottom of the lower lens section 1220B. The two covers 1210A, 1210B hold the lens array assembly 1200 together. Each of the components of the lens array 1200 has mating elements that allow the components to attach and be held together. The mating elements also assist during assembly.

Figure 10A:
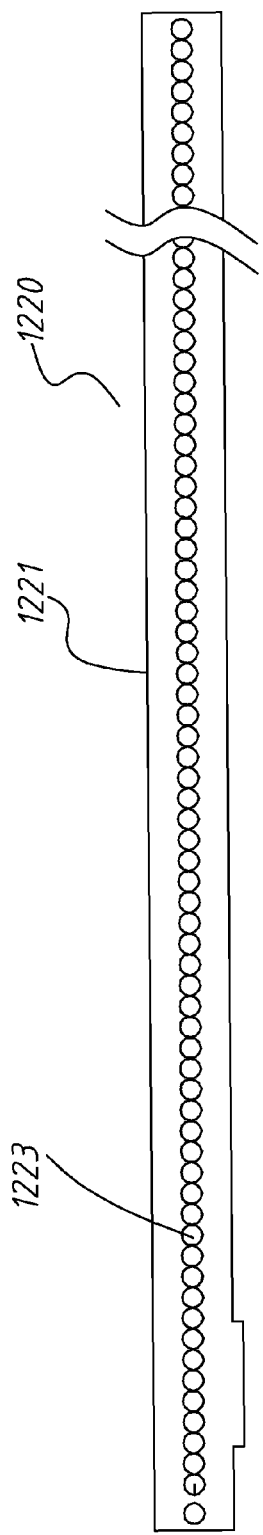
FIG. 10A is a top view of a lens section of a lens array according to an embodiment of the present invention.
Figure 10B:
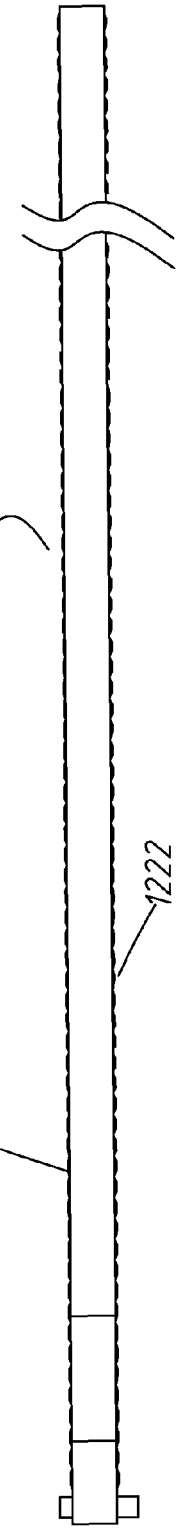
FIG. 10B is a side view of a lens section of a lens array according to an embodiment of the present invention.
Figure 10C:
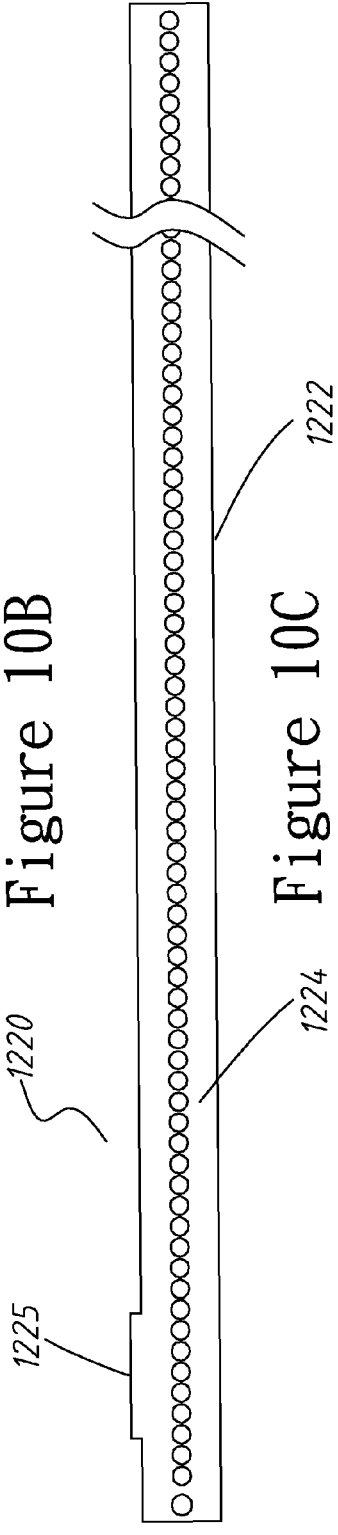
FIG. 10C is a bottom view of a lens section of a lens array according to an embodiment of the present invention.

Refer to FIG. 10A, which is a top view of a lens section of a lens array according to an embodiment of the present invention, FIG. 10B, which is a side view of a lens section of a lens array according to an embodiment of the present invention, and FIG. 10C, which is a bottom view of a lens section of a lens array according to an embodiment of the present invention.

The lens section 1220 comprises a first surface 1221 and a first plurality of lenses 1223 are formed with their optical axes in line, spaced apart equally by one inter-axis distance. The line of the centers of the first plurality of lenses 1223 in this example embodiment is along the center line of the lens section 1220. A surface of the cover fits snugly against the lens first surface 1221 so that the plurality of holes of the cover are lined up with their centers on the optical axes of the first plurality of lenses 1223.

The second surface 1222 of the lens section 1220 has a second plurality of lenses 1224 formed with their optical axes in line, spaced apart equally by one inter-axis distance. The line of the centers of the first plurality of lenses 1223 in this example embodiment is along the center line of the lens section 1220. A surface of the cover fits snugly against the second surface 1222 so that the plurality of holes in the cover is lined up with their centers on the optical axes of the second plurality of lenses 1224.

The lens section 1220 further comprises at least one mating element 1225 to mate with mating elements of the middle holder to assist in assembly and hold the lens section and the middle holder together.

The lenses of the lens section on both surfaces have identical diameters and optical radii.

The plurality of optical axes of the first plurality of lenses 1223 are inline with the plurality of optical axes of the second plurality of lenses 1224. Please note that the optical axes of the second plurality of lenses 1224 are aligned with the optical axes of the first plurality of lenses 1223 and that the number of lenses in the first plurality of lenses 1223 is the same as the number of lenses in the second plurality of lenses 1224.

Figure 11A:
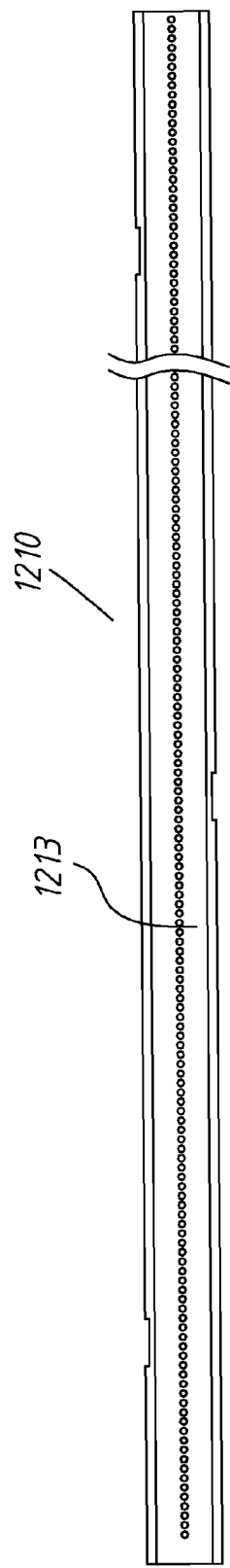
FIG. 11A is a top view of a cover of a lens array according to an embodiment of the present invention.
Figure 11B:
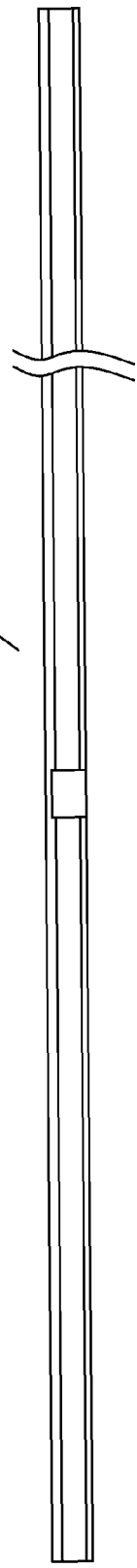
FIG. 11B is a side view of a cover of a lens array according to an embodiment of the present invention.
Figure 11C:
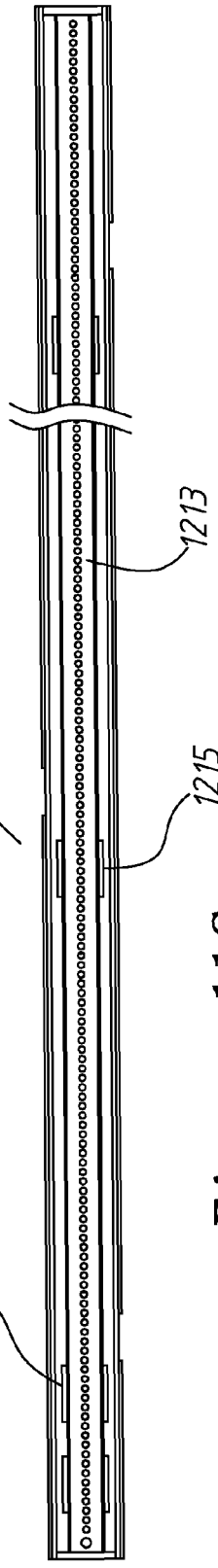
FIG. 11C is a bottom view of a cover of a lens array according to an embodiment of the present invention.

Refer to FIG. 11A, which is a top view of a cover of a lens array according to an embodiment of the present invention, FIG. 11B, which is a side view of a cover of a lens array according to an embodiment of the present invention, and FIG. 11C, which is a bottom view of a cover of a lens array according to an embodiment of the present invention.

The cover 1210 comprises a plurality of holes 1213 that are sized and spaced according to the size and spacing of the lenses on the lens section. In an embodiment of the present invention the holes 1213 are smaller in diameter than the diameter of the lenses.

The cover 1210 also comprises a plurality of mating elements 1215 that mate with mating elements on the middle holder in order to attach and hold the lens array assembly together. In an embodiment of the present invention the mating elements 1215 are male elements, for example posts, tabs, or risers and the mating elements on the middle holder are female elements, for example holes, slots, indentations, or channels. In another embodiment the genders of the mating elements are switched.

Figure 12A:
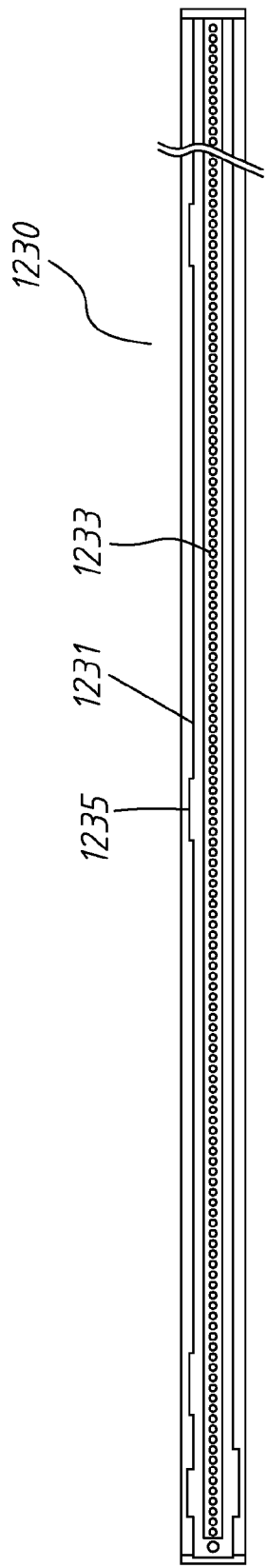
FIG. 12A is a top view of a middle holder of a lens array according to an embodiment of the present invention.
Figure 12B:
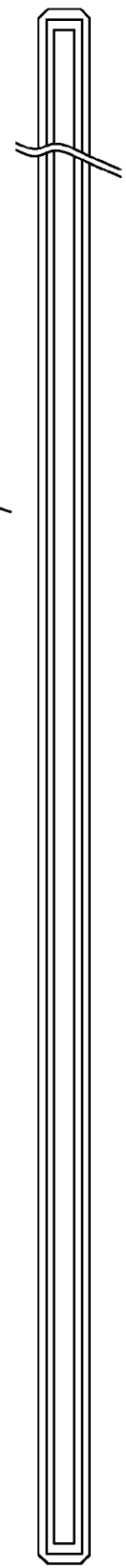
FIG. 12B is a side view of a middle holder of a lens array according to an embodiment of the present invention.
Figure 12C:
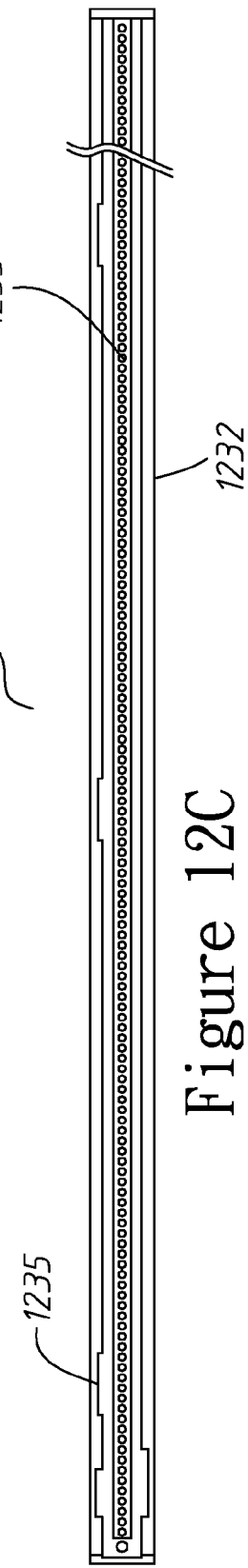
FIG. 12C is a bottom view of a middle holder of a lens array according to an embodiment of the present invention.

Refer to FIG. 12A, which is a top view of a middle holder of a lens array according to an embodiment of the present invention, FIG. 12B, which is a side view of a middle holder of a lens array according to an embodiment of the present invention, and FIG. 12C, which is a bottom view of a middle holder of a lens array according to an embodiment of the present invention.

The middle holder 1230 comprises a plurality of holes 1233. The size and spacing of the holes 1233 are related to the size and spacing of the lenses of the lens sections. A plurality of mating elements 1235 is disposed on the top surface 1231 and the bottom surface 1232 of the middle holder 1230. These mating elements 1235 mate with the mating elements of the cover holder in order to attach and hold the lens array assembly together.

Figure 13A:
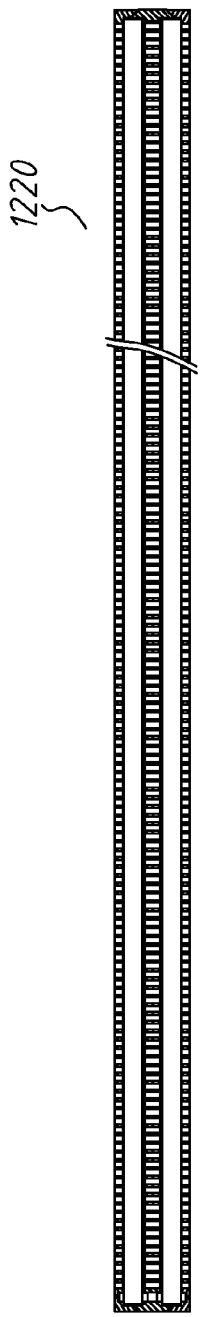
FIG. 13A is a diagram illustrating an assembled lens array of a miniaturized linear light source sub-module according to an embodiment of the present invention.
Figure 13B:
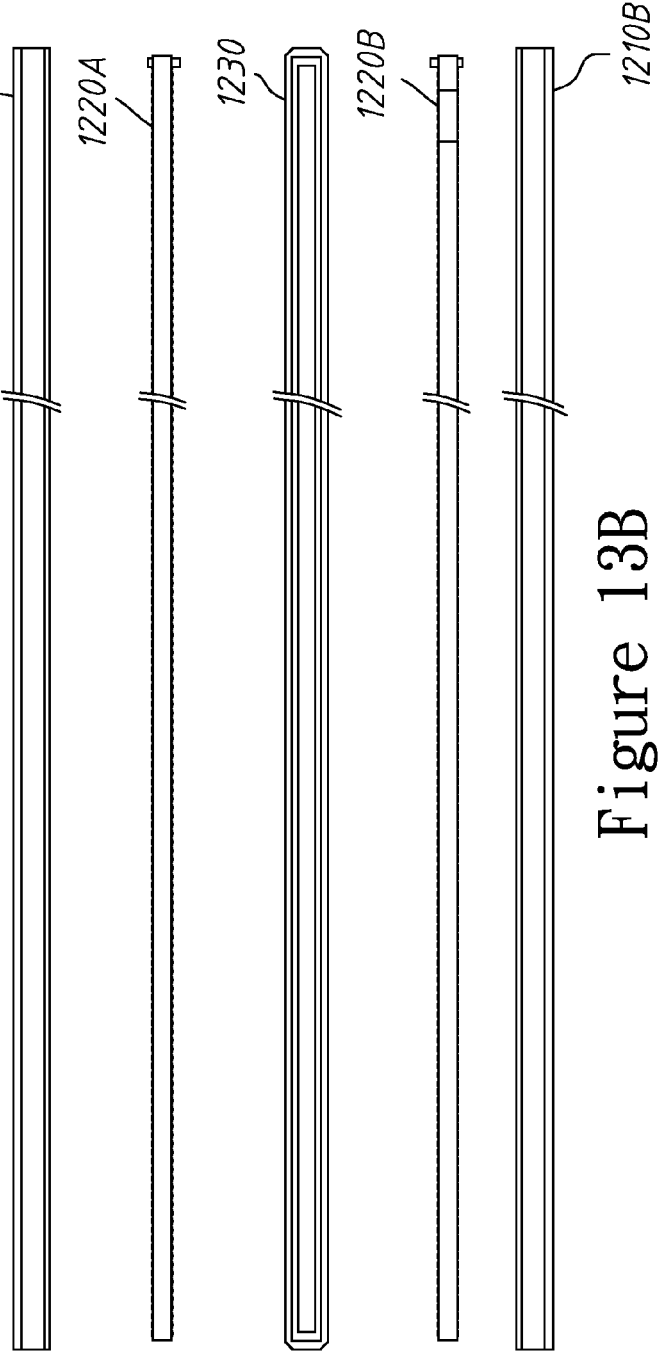
FIG. 13B is a diagram illustrating an exploded view of a lens array according to an embodiment of the present invention.

Refer to FIG. 13A, which is a diagram illustrating an assembled lens array of a miniaturized linear light source sub-module according to an embodiment of the present invention, and FIG. 13B, which is a diagram illustrating an exploded view of a lens array according to an embodiment of the present invention.

The lens array 1200 of the present invention comprises a top cover 1210A, a bottom cover 1210B, a top lens section 1220A, a bottom lens section 1220B, and a middle holder 1230.

To assemble the lens array 1200 of the present invention mating elements of the top lens section 1220A mate with mating elements of the top surface of the middle holder 1230 and mating elements of the bottom lens section 1220B mate with mating elements of the bottom surface of the middle holder 1230. Additionally, mating elements of the top cover 1210A mate with mating elements of the top surface of the middle holder 1230 and mating elements of the bottom cover 1210B mate with mating elements of the bottom surface of the middle holder 1230. The mating elements of the covers, lens sections, and the middle holder cooperate to attach and hold the lens array assembly together.

Figure 14:
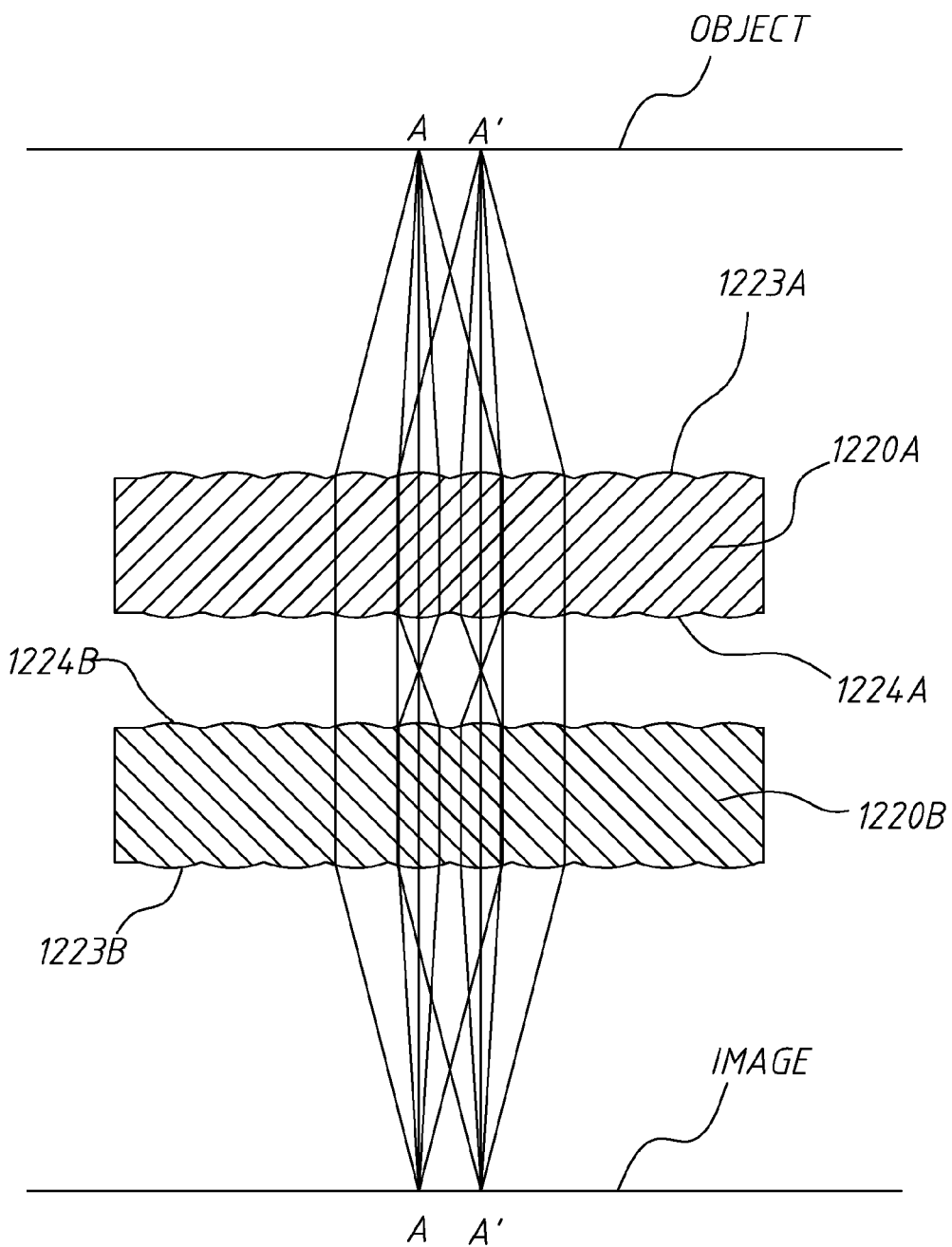
FIG. 14 is a diagram illustrating imaging through lens sections of a lens array according to an embodiment of the present invention.

Refer to FIG. 14, which is a diagram illustrating imaging through lens sections of a lens array according to an embodiment of the present invention.

In application, an object is positioned at a location that offers proper focus above the lens sections 1220 of the lens array. Light illuminates areas of the object. For example purposes these areas are designated A and A'. As the light illuminates the object's A and A' and the light enters the top lens section 1220A via the lenses 1223A. The light travels through the top lens section 1220A and exits through the lenses 1224A. The light continues through the space between the two lens sections and enters the bottom lens section 1220B via lenses 1224B. The light travels through the bottom lens section 1220B and exits through the lenses 1223B. The lenses direct the light so that an image of the object's A and A' is focused and a suitable image of the object is obtained. For example, the light is directed towards an array of sensors which detect and store the image data.

Figure 15A:
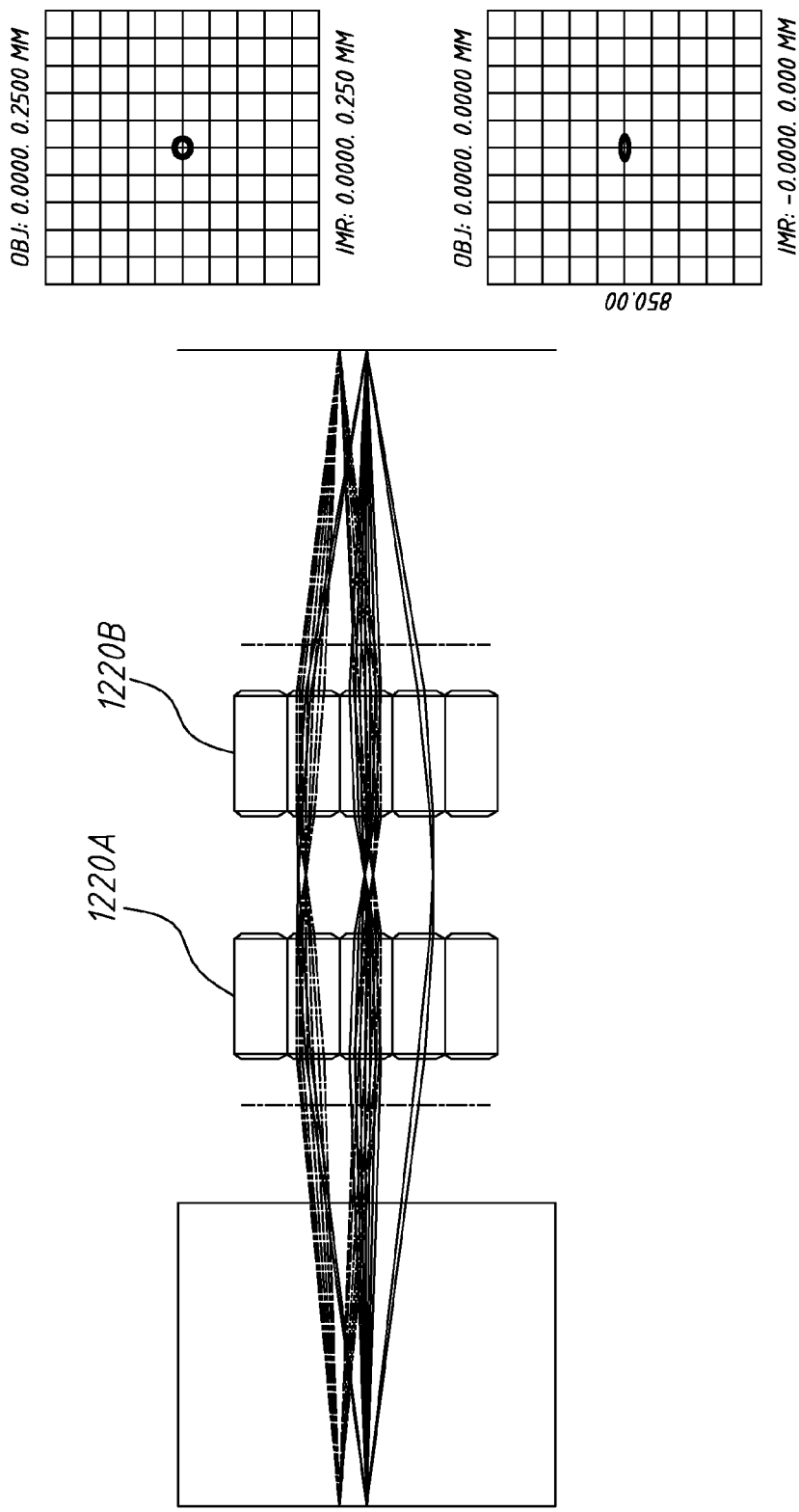
FIG. 15A is a diagram illustrating imaging through lens sections of a lens array with an object in focus according to an embodiment of the present invention.
Figure 15B:
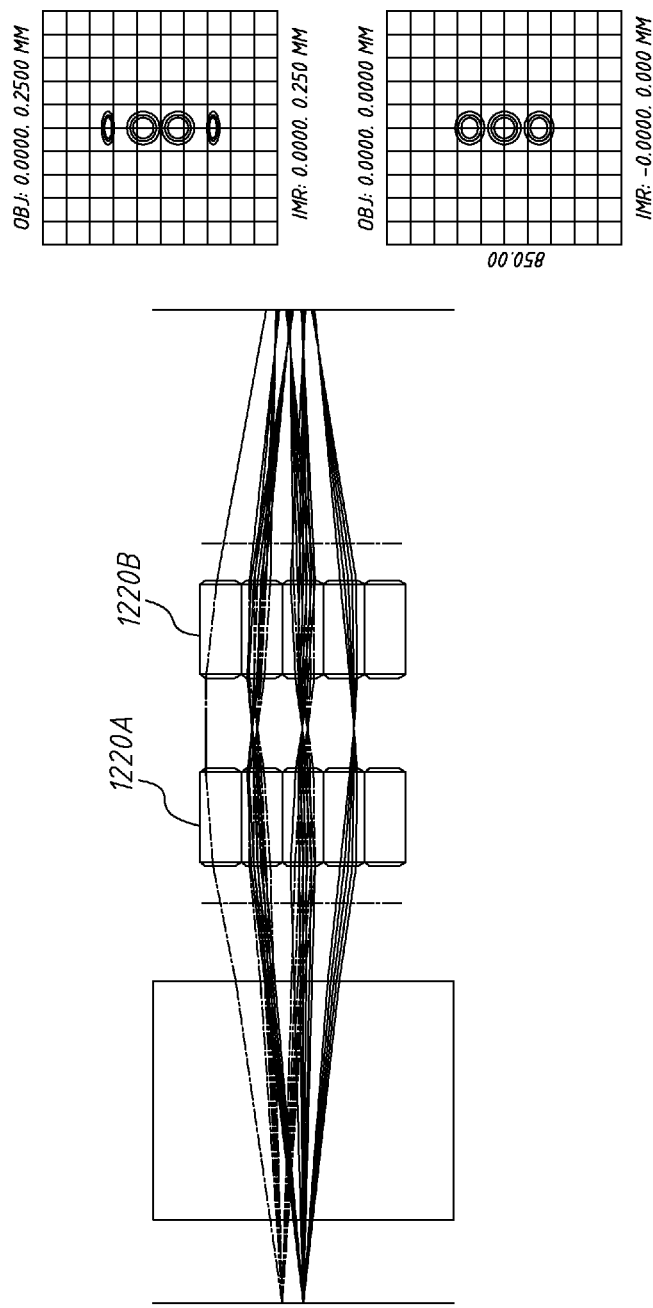
FIG. 15B is a diagram illustrating imaging through lens sections of a lens array with an object 1 mm above the focus plane according to an embodiment of the present invention.
Figure 16:
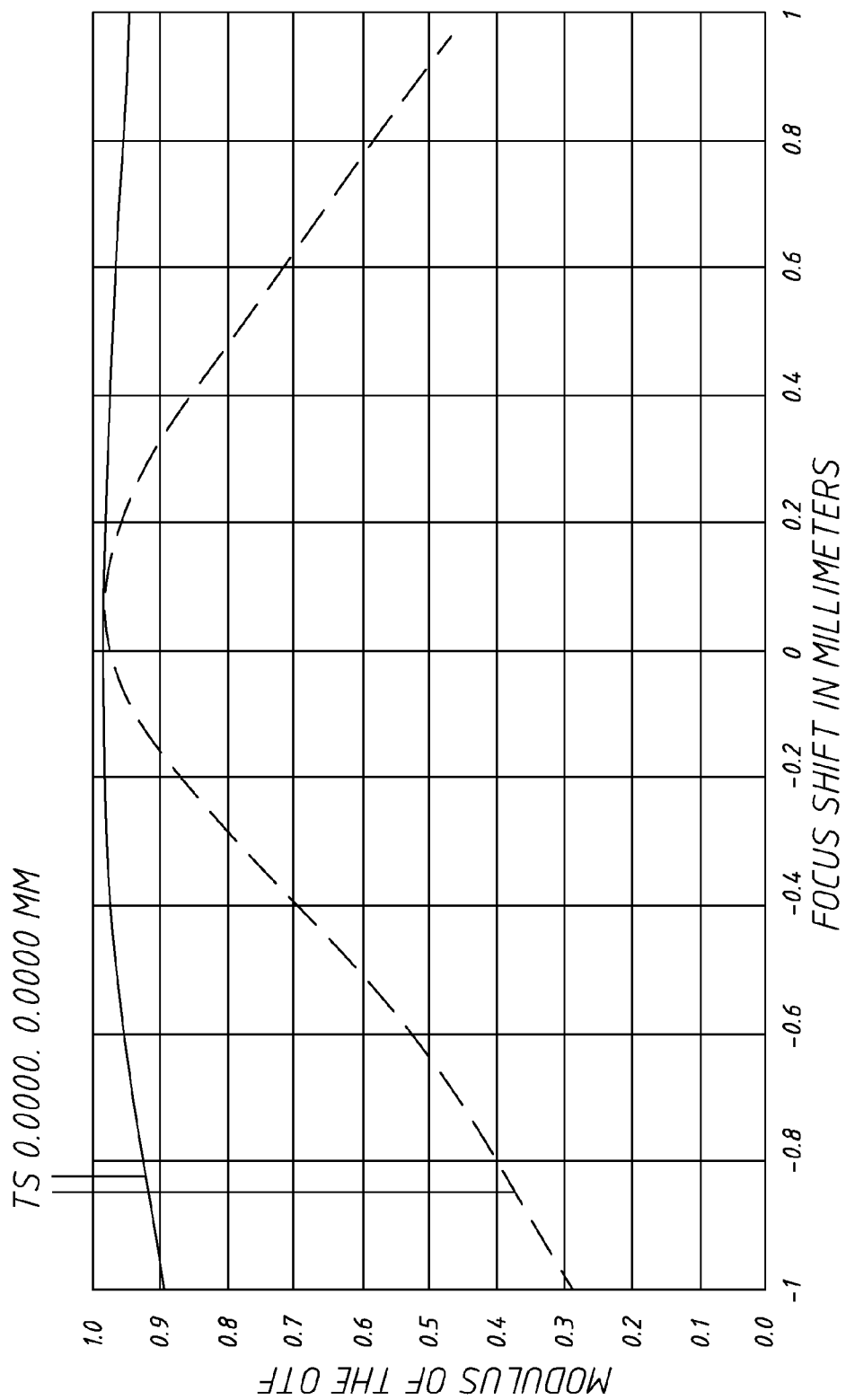
FIG. 16 is a graph illustrating through-focus performance of a lens array according to an embodiment of the present invention.

Refer to FIG. 15A, which is a diagram illustrating imaging through lens sections of a lens array with an object in focus according to an embodiment of the present invention, FIG. 15B, which is a diagram illustrating imaging through lens sections of a lens array with an object 1 mm above the focus plane according to an embodiment of the present invention, and FIG. 16, which is a graph illustrating through-focus performance of a lens array according to an embodiment of the present invention.

As shown in FIGS. 15A, 15B, and 16 the lens array of the present invention provides superior performance. Even with the object 1 mm out of the ideal focus position an acceptable image is obtainable. The lens array of the present invention provides improved depth of field. Additionally the lens array has enhanced image uniformity and brightness.

In an embodiment, the first lens section and second lens section are made of a refractive, substantially transparent polymer and the cover and middle holder are made of an opaque polymer, for example black, to absorb and/or block undesirable scattered or external light.

When the lens array assembly is used in an image scanner, it is very important that image light does not pass from one lens into another lens that is not perpendicular to it. When this light progresses into an adjacent lens, the resultant image that the sensor captures is a ghost image of the adjacent lens. This is called cross-talk and is undesirable.

An advantage of the present invention is that due to the wall thickness of the middle holder extend to the edges of the individual lenses, cross-talk is prevented.

If the lens array assembly doesn't have a suitable lens housing, light can pass between lenses and result in ghosting. However, in the present invention if light passes from one lens into the hole of the middle holder, the light is absorbed by the wall of the middle holder thus preventing the undesirable light from entering the adjacent lens. As a result, cross-talk is eliminated and ghosting is prevented.

The dots per inch (DPI) resolution of the lens array is adjustable at design time by changing the optical radii, conic constant, or aspherical coefficients of the four lens groups. In contrast with the prior art rod lenses, the lens array can be designed to magnify the surface being imaged.

The lens array thus provides a substantial improvement over the prior art by reducing manufacturing complexity and materials costs. Furthermore, the lens array makes it substantially easier to increase the resolution of a device using the lens array compared to the prior art.

Figure 17:
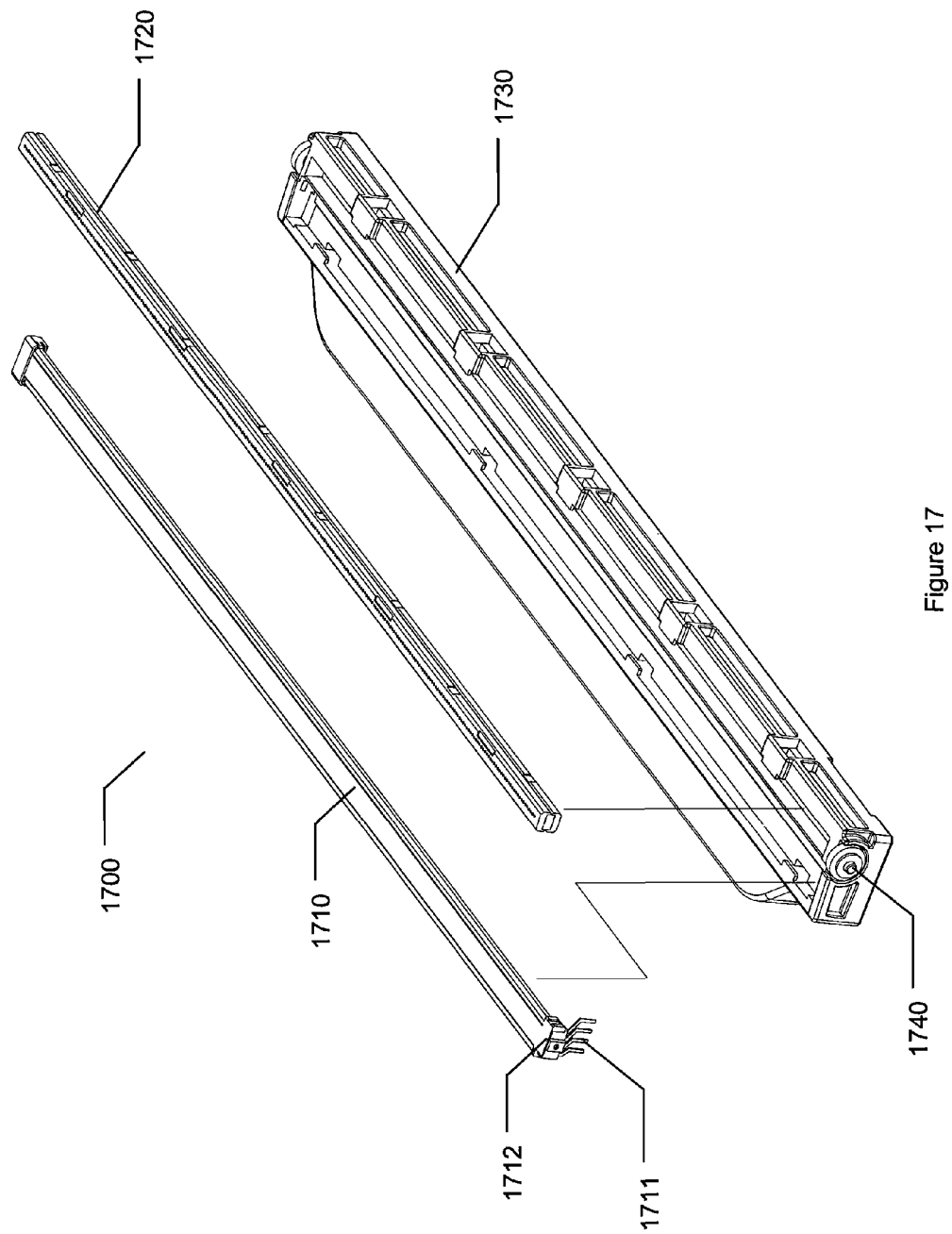
FIG. 17 is an exploded view drawing illustrating a miniaturized linear light source sub-module according to an embodiment of the present invention.
Figure 18:
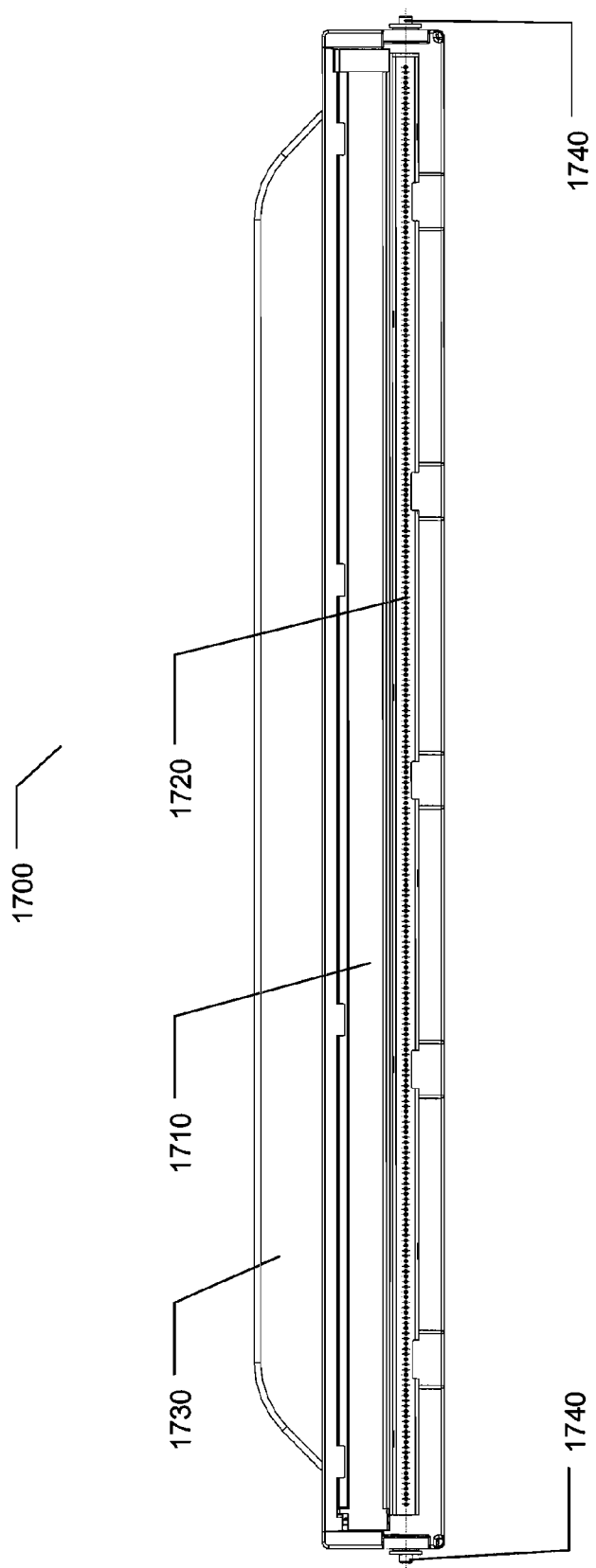
FIG. 18 is a drawing illustrating an assembled miniaturized linear light source sub-module according to an embodiment of the present invention.

Refer to FIG. 17, which is an exploded view drawing illustrating a miniaturized linear light source sub-module according to an embodiment of the present invention and to FIG. 18, which is a drawing illustrating an assembled miniaturized linear light source sub-module according to an embodiment of the present invention.

As shown in FIG. 17 and FIG. 18, the miniaturized linear light source sub-module 1700 of the present invention comprises an LED linear light source 1710 comprising a highly efficient light guide with a first reflecting surface to maximize light reflection and a second reflecting surface to enhance the uniformity of the emitted light and at least one light emitting diode light source 1712, a symmetrical lens array 1720 comprising an array of lenses for high-resolution imaging of a surface, and a sub-module housing 1730. The sub-module housing 1730 holds the lens array assembly 1720, the LED linear light source 1710 with dual reflecting surface light guide and the at least one light emitting diode light source to form the miniaturized linear light source sub-module 1700.

The LED linear light source 1720 further comprises LED electrical contacts 1711 on the LED light source package 1720. The LED electrical contacts 1711 couple with sub-module electrical contacts 1740 on the sub-module housing. Power supplied from a main module to the sub-module electrical contacts 1740 reaches the LED light source package 1712 via the LED electrical contacts 1711.

The assembled miniaturized linear light source sub-module provides a highly integrated, standardized, and miniaturized linear light source sub-module that can be installed in main modules of various formats. Utilizing the sub-module of the present invention simplifies manufacturing and production processes by providing a complete linear light source assembly.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A miniaturized linear light source sub-module comprising:
   a lens array assembly;
   a dual reflecting surface light guide comprising:
      a light emitting surface, and
      a v-shaped light reflecting surface opposite the light emitting surface, and
      an asymmetrical saw-toothed light reflecting surface disposed between the light emitting surface and the v-shaped light reflecting surface;
   at least one light emitting diode light source connected to the dual reflecting surface light guide; and
   a sub-module housing for holding the lens array assembly, the dual reflecting surface light guide, and the at least one light emitting diode light source.

2. The miniaturized linear light source sub-module of claim 1, the lens array assembly comprising:
- two identical lens sections, each lens section comprising a plurality of lenses;
- a middle holder between the two lens sections, the middle holder comprising a plurality of middle holes; and
- two identical covers encasing the middle holder, each cover comprising a plurality of cover holes, the cover holes and middle holes positioned to allow light to enter and exit the plurality of lenses.

3. The miniaturized linear light source sub-module of claim 2, where the two identical lens sections are formed from a transparent polymer and the two covers and the middle holder are formed from an opaque black polymer.

4. The miniaturized linear light source sub-module of claim 2, the middle holder, the two covers, and the two lens sections further comprising mating elements to hold the lens array assembly together.

5. The miniaturized linear light source sub-module of claim 1, the dual reflecting surface light guide further comprising:
- a top surface disposed between the light emitting surface and the v-shaped light reflecting surface; and
- a bottom surface opposite the top surface between the asymmetrical saw-toothed light reflecting surface and the v-shaped light reflecting surface.

6. The miniaturized linear light source sub-module of claim 5, the dual reflecting surface light guide further comprising:
- a light entry end surface disposed on a plane perpendicular to the top surface.

7. The miniaturized linear light source sub-module of claim 5, the dual reflecting surface light guide further comprising:
- a bottom cut-off surface on the light entry end surface of the light guide at a second angle from the bottom surface.

8. The miniaturized linear light source sub-module of claim 1, the asymmetrical saw-toothed light reflecting surface comprising:
- a plurality of notches and ridges with increasing gradient from the light entry end surface to an end opposite the light entry end surface.

9. The miniaturized linear light source sub-module of claim 1, the asymmetrical saw-toothed light reflecting surface comprising:
- a plurality of notches and ridges with decreasing gradient from the light entry end surface to an end opposite the light entry end surface.

10. The miniaturized linear light source sub-module of claim 1, the v-shaped light reflecting surface comprising two light reflecting surfaces at 90 degrees apart.

11. The miniaturized linear light source sub-module of claim 1, the asymmetrical saw-toothed light reflecting surface comprising a saw-tooth patterned surface with a constant pitch and constant saw-tooth angle.

12. The miniaturized linear light source sub-module of claim 1, the asymmetrical saw-toothed light reflecting surface comprising a saw-tooth patterned surface with an increasing saw-tooth depth.

13. The miniaturized linear light source sub-module of claim 1, the asymmetrical saw-toothed light reflecting surface comprising a saw-tooth patterned surface with an increasing saw-tooth height.

14. The miniaturized linear light source sub-module of claim 1, the dual reflecting surface light guide further comprising:
- an apex cut-off surface on the light entry end surface of the light guide at a first angle from an apex of the v-shaped light reflecting surface.

15. A miniaturized linear light source sub-module comprising:
- a lens array assembly, the lens array assembly comprising:
- two identical lens sections, each lens section comprising a plurality of first lenses and a plurality of second lenses;
- a middle holder between the two lens sections, the middle holder comprising a plurality of middle holes; and
- two identical covers encasing the middle holder, each cover comprising a plurality of cover holes, the cover holes and middle holes positioned to allow light to enter and exit the plurality of first lenses and the plurality of second lenses;
- a dual reflecting surface light guide, the dual reflecting surface light guide comprising:
- a light emitting surface;
- a v-shaped light reflecting surface opposite the light emitting surface;
- a top surface disposed between the light emitting surface and the v-shaped light reflecting surface;
- a bottom surface opposite the top surface; and
- an asymmetrical saw-toothed light reflecting surface between the bottom surface and the light emitting surface;
- at least one light emitting diode light source connected to the dual reflecting surface light guide; and
- a sub-module housing for holding the lens array assembly, the dual reflecting surface light guide, and the at least one light emitting diode light source.

16. The miniaturized linear light source sub-module of claim 15, the two identical covers, the middle holder, and the two identical lens sections further comprising mating elements to hold the lens array assembly together.

17. The miniaturized linear light source sub-module of claim 15, the dual reflecting surface light guide further comprising:
- a light entry end surface disposed on a plane perpendicular to the top surface.

18. The miniaturized linear light source sub-module of claim 15, the asymmetrical saw-toothed light reflecting surface comprising:
- a plurality of notches and ridges with increasing gradient from the light entry end surface to an end opposite the light entry end surface.

19. The miniaturized linear light source sub-module of claim 15, the asymmetrical saw-toothed light reflecting surface comprising:
- a plurality of notches and ridges with decreasing gradient from the light entry end surface to an end opposite the light entry end surface.

20. The miniaturized linear light source sub-module of claim 15, the v-shaped light reflecting surface comprising two light reflecting surfaces at 90 degrees apart.

21. The miniaturized linear light source sub-module of claim 15, the asymmetrical saw-toothed light reflecting surface comprising a saw-tooth patterned surface with a constant pitch and constant saw-tooth angle.

22. The miniaturized linear light source sub-module of claim 15, the asymmetrical saw-toothed light reflecting surface comprising a saw-tooth patterned surface with an increasing saw-tooth height.

23. The miniaturized linear light source sub-module of claim 15, the dual reflecting surface light guide further comprising:

an apex cut-off surface on the light entry end surface of the light guide at a first angle from an apex of the v-shaped light reflecting surface and a bottom cut-off surface on the light entry end surface of the light guide at a second angle from the bottom surface.

24. A miniaturized linear light source sub-module comprising:
- a lens array assembly, the lens array assembly comprising:
- a first lens section comprising a plurality of first lenses and a plurality of second lenses;
- a second lens section comprising a plurality of third lenses and a plurality of fourth lenses;
- a middle holder positioned between the first lens section and the second lens section, the middle holder comprising a plurality of middle holes encircling the plurality of second lenses and the plurality of third lenses;
- a top cover covering the first lens section, the top cover comprising a plurality of top cover holes over the plurality of first lenses; and
- a bottom cover covering the second lens section, the bottom cover comprising a plurality of bottom cover holes over the plurality of fourth lenses
- a dual reflecting surface light guide, the dual reflecting surface light guide comprising:
- a light emitting surface;
- a v-shaped light reflecting surface opposite the light emitting surface, the v-shaped light reflecting surface comprising two light reflecting surfaces at 90 degrees apart;
- a top surface disposed between the light emitting surface and the v-shaped light reflecting surface;
- a bottom surface opposite the top surface;
- a light entry end surface disposed on a plane perpendicular to the top surface; and
- an asymmetrical saw-toothed light reflecting surface between the bottom surface and the light emitting surface, the asymmetrical saw-toothed light reflecting surface comprising a plurality of notches and ridges with increasing gradient from the light entry end surface to an end surface opposite the light entry end surface;
- a light emitting diode light source connected to the light entry end surface; and
- a sub-module housing for holding the lens array assembly, the dual reflecting surface light guide, and the light emitting diode light source.

25. The miniaturized linear light source sub-module of claim 24, the middle holder, the top cover, the bottom cover, the first lens section, and the second lens section further comprising mating elements to hold the lens array assembly together.

26. The miniaturized linear light source sub-module of claim 24, the asymmetrical saw-toothed light reflecting surface comprising a saw-tooth patterned surface with a constant pitch and constant saw-tooth angle.

27. The miniaturized linear light source sub-module of claim 24, the asymmetrical saw-toothed light reflecting surface comprising a saw-tooth patterned surface with an increasing saw-tooth height.

28. The miniaturized linear light source sub-module of claim 24, the dual reflecting surface light guide further comprising:
- an apex cut-off surface on the light entry end surface of the light guide at a first angle from an apex of the v-shaped light reflecting surface; and
- a bottom cut-off surface on the light entry end surface of the light guide at a second angle from the bottom surface.

* * * * *